June 10, 1924.
P. CROSLEY, JR
1,497,131
TIRE PATCH
Filed April 1, 1918
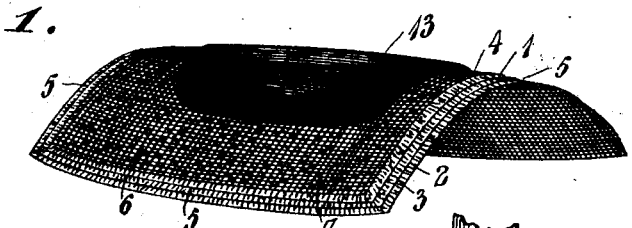
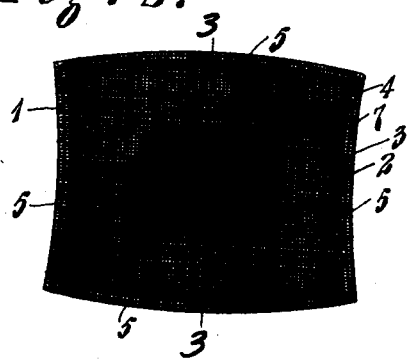
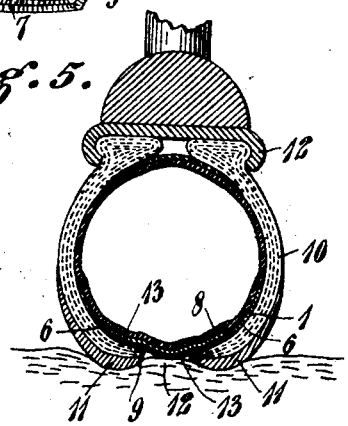
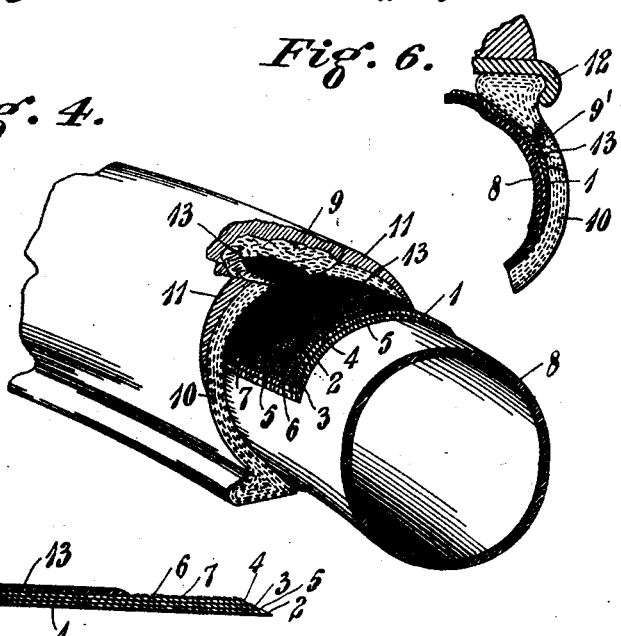
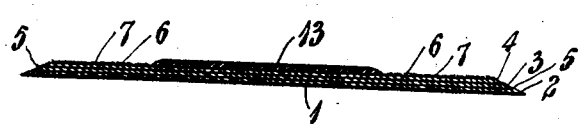
Witnesses:
Clarence Verden
Irene Parker
Inventor
Powel Crosley Jr
By James N Ramsey
Attorney.

Patented June 10, 1924.

1,497,131

UNITED STATES PATENT OFFICE.

POWEL CROSLEY, JR., OF CINCINNATI, OHIO, ASSIGNOR TO VIRGINIA-CAROLINA RUBBER COMPANY, OF RICHMOND, VIRGINIA, A CORPORATION OF VIRGINIA.

TIRE PATCH.

Application filed April 1, 1918. Serial No. 225,988.

*To all whom it may concern:*

Be it known that I, POWEL CROSLEY, Jr., a citizen of the United States, and a resident of Cincinnati, in the county of Hamilton and State of Ohio, have invented certain new and useful Improvements in Tire Patches, of which the following is a specification.

My invention relates to pneumatic tires, and its object is to provide a patch for relatively large holes in pneumatic tire casings, held in place between the inside of the casing and the outer side of the inner tube, which patch will properly reinforce the inner tube and will also withstand the wear to which that part of the patch exposed in the hole or blow-out is subjected by repeatedly coming in contact with the road surface or other objects.

My invention consists in the new improved article of manufacture as herein set forth and claimed.

In the drawing:

Fig. 1 is a perspective view of a blow-out patch constructed according to my invention;

Fig. 2 is a plan view of the same in flattened condition;

Fig. 3 is an enlarged cross-section of the same on a plane corresponding to the line 3—3 of Fig. 2;

Fig. 4 is a perspective view of part of a tire casing having a blow-out in its tread with my improved patch in proper position with relation to the blow-out;

Fig. 5 is a cross-section corresponding to Fig. 4, but showing how the blow-out and its patch are brought into contact with the road surface; and Fig. 6 is a partial cross-section similar to Fig. 5, but showing the tire with the blow-out near the rim, and showing how my improved patch is used in such a case.

As I prefer to construct my improved patch 1, it is made of several layers of textile fabric preferably of the same kind as that generally used in making tire casings, and as here shown, the number of layers being three. These layers 2, 3 and 4 are suitably secured together, preferably by actual vulcanization as in the construction of tire casings. Also in order that the patch will conform properly to the inner surface of the casing on which it is used and to the outer surface of the inner tube which holds it tight against the casing, the edges 5 of the patch are preferably skived after the layers are secured together; or else the same feather-edged effect is obtained by securing together layers of successively less length and width. In either case, the appearance of the edges will be as indicated especially in Figs. 1 and 3.

I also prefer to cover the surface 6 of the patch with a suitable cement or other adhesive material 7, preferably a self-vulcanizing cement, which will finally secure the patch in place inside the casing under the hole or blow-out. It will be seen that a patch thus constructed of textile fabric and slightly curved outwardly will be very strong and will effectively reinforce and support the wall of the inner tube 8 lying within the extent of the blow-out or opening 9 in the outer casing 10 of the tire.

But in actual use, especially if the blow-out be in the tread 11 of the tire, the outer surface of such a patch thus applied will be exposed to wearing contact with outer objects such as the road surface 12 (Fig. 5) where the tread 11 of the tire flattens somewhat and naturally yields upwardly and inwardly more in its weak part around the hole or blow-out 9 and where the patch 1 is slightly distended downwardly and outwardly under the pressure of the inner tube 8, which distension is very much exaggerated in Fig. 5.

Where the hole or blow-out 9' is near the rim 12, it may be primarily due to a rim cut or some other abrasion against the side of the tire; but where the patch 1 is used for such a blow-out or opening, it is, of course, also slightly distended therein and the tire may at times be so deflated as to bring the patch exposed in the opening 9' against the rim 12, as well as frequently against other outer objects such as curbs or large obstructions in the roadway or in deep ruts on bad roadways.

It will be seen, therefore, that whether the blow-out or hole be in the tread or on the side of the tire even up near the rim, the patch where it is exposed in the blow-out or hole is subjected to considerable impact and abrasion. The consequence is that such a patch merely of the proper material to be strong enough to properly reinforce the inner tube is good only for temporary use. Such a patch may be inserted as described, at the place along the road where the blow-out occurs, and will wear long enough to permit the vehicle to be brought to a place where the tire may be repaired or a new tire provided. It may also be stated that generally when a blow-out or large opening of this kind is incurred, it is generally considered unprofitable to repair the casing and an entirely new casing is generally substituted for it.

A new casing is thus generally substituted for the one having the blow-out or relatively large opening, because the casing will generally have been subjected to general wear to such an extent that its probable remaining life regardless of the blow-out or large opening would be insufficient to justify the expenditure necessary to provide the casing with a new section where it is thus torn; and as I have conceived in my invention, it is also because the ordinary repair patch, merely consisting of a fabric with possibly some means for holding it in position under the blow-out, is not to be depended upon for any extensive use such as would enable it to take the place of a new section in the casing or obviate the furnishing of a complete new casing. This is because such a patch, even though applied inside the casing, is exposed in the relatively large rent or blow-out. While it is thus protected against displacing influences as it would not be if applied to the exterior of the casing, it is not in any case practically protected against wear. Such fabric is not adapted to withstand wear and when worn to any considerable extent is so weakened that it will cease to properly support the inner tube, and another blow-out will occur at this place in the tire within a very short time if it be attempted to make the use of the blow-out patch any more than merely a temporary one until the tire can be repaired or replaced.

I obviate the necessity of having the casing repaired in any way or of furnishing a new casing except when the casing in general has become worn out, by providing the patch 1, preferably made up of the layers 2, 3 and 4, with a coating of suitable wear-resisting material on its outer surface 6. Preferably, as shown herein, this coating extends across only the central part of the surface 6, so as to be of ample area to protect all of the structure of the patch 1 that would be within the limits of the blow-out, rent or hole 9 or 9' in the casing 10. The best material for this purpose is the tough rubber of the kind which is used for making the treads 11 of the tire casing 10. When this material is used, it is provided in a moderately thick layer and vulcanized onto the surface 6 of the patch. Thus, as shown herein, this coating 13 is roughly of elliptical shape as best seen in Fig. 2, and may have its edges 14 slightly beveled as indicated in Fig. 3, so that it conforms properly to the inner surface of the casing 10. as seen in Figs. 4, 5 and 6, this coating 13 is of sufficiently large extent relative to the extent of the blow-out or hole 9 or 9' on which the patch is used to lap under this inner surface of the casing 10 for a considerable distance all around the opening or blow-out 9 or 9'; but at the same time leaving space 15 of the outer surface 6 of the textile-fabric part of the patch in contact with the said inner surface of the casing 10; which surface 6, as before alluded to, is preferably covered with a self-vulcanizing cement or other adhesive 7, which, after the patch has been pressed out against the inner side of the casing 10 under the heavy pneumatic pressure in the inner tube 8 for a considerable time, becomes firmly attached to the inside of the casing.

It will be seen that this coating 13 of rubber or other suitable material exposed in the opening or blow-out 9 or 9' is adapted to receive the impact and abrasion of the road surface 10 or other exterior object and to withstand the wear and tear of such impact and abrasion for a very considerable length of time. I have found in practice that such a coating of moderate and practicable thickness of suitable rubber, such as is used for tire treads, will wear longer than the remainder of the tire.

It is thus unnecessary either to replace a section of casing thus badly torn or blown out or to replace the entire casing. It is necessary only to mount my improved patch therein under the rent or blow-out and continue to run the tire as usual. The edges of the rent or blow-out are nearly always very irregular and ragged, and will afford practically no support for any plug that it is attempted to secure therein. For this reason alone it is more practical to close this opening by a smooth surfaced patch pressed very tightly against the inner side of the casing around the opening and with its smooth surface extending across and exposed in the opening without any extension out therethrough. Such an extension, if present, being unsupported by the sides of the opening to any practical degree and thus deflected laterally in various directions by the impacts as it strikes the road surface is of more detriment than benefit because it serves to impose strains on the patch structure by which the structure itself is more or less disrupted, as well as displaced from its tight bearing against the inner side of the casing. Also, by having the surface of the rubber coating uniformly smooth, any part of it may with equal facility be exposed in the opening; and it is thus possible to shift the patch about as parts of it wear and utilize various new heretofore unexposed parts of the patch and thereby prolong the usefulness of the patch if the tire itself last long enough after being patched to warrant this. At the same time, it is not desirable to extend the rubber coating over the entire surface of the patch both for reasons of economy in the use of rubber and for the reason that the uncoated part of the patch when provided with the adhesive substance 7 on such uncoated part that may be firmly enough attached to the inner side of the casing to minimize the disruptive influences of the impacts on the exposed part of the patch.

In many instances tires may be used two or three times as long as they otherwise would be used, with the result of great saving in expense to the user. A general use of my invention will also result in a decided reduction of the waste of tire materials; because it enables all of the material put into a tire to be utilized to its fullest extent before discarding the tire.

In elucidating the construction and use of my invention as is required, I have shown and described rather specifically certain constructional details deemed preferable in and in connection with my invention, but I do wish to be understood as being limited to such precise showing and description, but having fully described an example of my invention, what I claim as new and desire to secure by Letters Patent is:

1. A preformed tire patch comprising a slightly curved and relatively wide and thin flexible element of fibrous material, with both of its sides substantially smooth and its edges thinner than its exterior parts, adapted to extend part of the way only around an inner tube between said tube and the outer tire casing and to have its edges free, with said tube and casing meeting past said edges all around said patch, and a wearing coating of tough tread rubber on the side of said flexible element that is adapted to lie against the outer casing, said tough tread rubber coating being of less area than said side of said element and having a substantially smooth even surface to bear directly against the inside of said tire casing around a rent therein, and to extend across and be directly exposed in said rent for the purposes set forth, and an adhesive coating on parts of said side that is to lie next to said outer tire casing whereby said patch is held in any position against said inner tube and outer casing by the bearing of said tube and casing against the edges and respective surfaces of said element and said wearing coating of tough tread rubber without the use of any extraneous fastening means.

2. A slightly curved preformed tire patch, comprising a plurality of layers of textile fabric suitably vulcanized together and having a feathered edge, a substantially flat smooth tough tread rubber of less area than said layers of fabric mounted on the central part of and vulcanized upon the outer layer of fabric and a coating of self-vulcanizing cement upon the surface of said outer layer of fabric surrounding said flat smooth tough rubber, whereby said patch may be inserted between the inner tube and outer tire casing across a rent in said outer tire casing with the tread rubber extending across said rent with its outer edges resting against the inner surface of the outer casing, whereby it will self-vulcanize itself to said outer tire casing, and be securely held in any position between said inner tube and outer tire casing without the use of any extraneous fastening means.

3. A slightly curved preformed tire patch comprising a plurality of layers of fabric of different areas forming a substantially beveled edge upon its outer surface, said layers being vulcanized together and having a substantially flat tough tread rubber, provided with a thin edge beveled upon its outer surface, of less area than the outer layer of fabric and vulcanized on the central part therof, and a coating of self-vulcanizing material whereby said patch is adapted to be inserted between the inner tube and outer casing across a rent and permit said tough rubber to engage the casing surrounding said rent and said patch outside of said rubber to self-vulcanize itself to said outer casing with the free beveled edge of said patch engaging the outer casing and inner tube, said patch being adapted to be placed in any position in the casing and to be held in place without the use of any extraneous fastening means.

4. A slightly curved preformed tire patch comprising a plurality of layers of fabric of different areas vulcanized together and having a feathered edge, a tough tread rubber of less area than the outer layer of fabric and provided with a feathered edge and vulcanized on the central part thereof, and a coating of self-vulcanizing material on said outer coating surrounding said tough tread rubber, whereby said patch is adapted to be inserted between the inner tube and outer casing across a rent and permit said tough rubber to engage the inner surface of the casing surrounding said rent and said patch outside of said rubber to vulcanize itself to said outer casing with the free feathered edge of said patch engaging the outer casing and inner tube, said patch being adapted to be placed in any position in the casing and to be held in place without the use of any extraneous fastening means.

5. A preformed tire patch comprising a plurality of layers of fabric of different areas vulcanized together and having a feathered edge, a substantially flat tough tread rubber of less area than the outer layer of fabric and vulcanized thereon and a coating of self-vulcanizing material on said outer layer of fabric surrounding said tread rubber, whereby said patch is adapted to be inserted between the inner tube and outer casing across a rent and permit said tough rubber to engage the inner surface of the casing surrounding said rent and said patch outside of said rubber to vulcanize itself to said outer casing with the free feathered edge of said patch engaging the outer casing and inner tube, said patch being adapted to be placed in any position in the casing and to be held in place without the use of any extraneous fastening means.

POWEL CROSLEY, Jr.

Witnesses:
CLARENCE PERDEW,
IRENE PARKER.